(12) United States Patent
Gadde et al.

(10) Patent No.: US 10,972,729 B2
(45) Date of Patent: Apr. 6, 2021

(54) DEBLOCKING FILTER SELECTION AND APPLICATION IN VIDEO CODING

(71) Applicant: QUALCOMM Incorporated, San Diego, CA (US)

(72) Inventors: Akshay Gadde, Fremont, CA (US); Li Zhang, San Diego, CA (US); Wei-Jung Chien, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/250,794

(22) Filed: Jan. 17, 2019

(65) Prior Publication Data
US 2019/0230353 A1 Jul. 25, 2019

Related U.S. Application Data

(60) Provisional application No. 62/619,777, filed on Jan. 20, 2018.

(51) Int. Cl.
| | |
|---|---|
| *H04N 19/117* | (2014.01) |
| *H04N 19/14* | (2014.01) |
| *H04N 19/176* | (2014.01) |
| *H04N 19/196* | (2014.01) |
| *H04N 19/61* | (2014.01) |
| *H04N 19/86* | (2014.01) |

(52) U.S. Cl.
CPC ........... *H04N 19/117* (2014.11); *H04N 19/14* (2014.11); *H04N 19/176* (2014.11); *H04N 19/196* (2014.11); *H04N 19/61* (2014.11); *H04N 19/86* (2014.11)

(58) Field of Classification Search
CPC .... H04N 19/117; H04N 19/176; H04N 19/61; H04N 19/196; H04N 19/86; H04N 19/14

USPC ...................................................... 375/240.02
See application file for complete search history.

(56) References Cited

U.S. PATENT DOCUMENTS

| | | | |
|---|---|---|---|
| 2006/0110065 A1* | 5/2006 | Huang | .................... G06T 5/002 382/275 |
| 2015/0264406 A1 | 9/2015 | Kim et al. | |

FOREIGN PATENT DOCUMENTS

EP          1659798 A2     5/2006

OTHER PUBLICATIONS

Chen Y W., et al., "Description of SDR, HDR and 360° Video Coding Technology Proposal by Qualcomm and Technicolor"—"low and High Complexity Versions", 10. JVET Meeting, Oct. 4, 2018-Apr. 20, 2018, San Diego, (The Joint Video Exploration Team of ISO/IEC JTC1/SC29/WG11 and ITU-T SG.16 ), URL:http://phenix.int-evry.fr/jvet/,,No.JVET-J0021-v5, Apr. 14, 2018 (Apr. 14, 2018), XP030151183, pp. 1-43.

(Continued)

*Primary Examiner* — On S Mung
(74) *Attorney, Agent, or Firm* — John Rickenbrode

(57) ABSTRACT

Codecs that use larger blocks may have larger boundary regions that may benefit from filtering. In some embodiments, the deblocking filter determines filters and/or a number of samples of the block to be filtered based on block dimensions. For example, In one embodiment, deblocking filter parameters for the video block are determined based on at least one dimension of the size of the video block. The filter parameters include a filter to be applied or a number of pixels along a boundary with a neighboring block to which the filter is to be applied determined based on the at least one dimension.

28 Claims, 5 Drawing Sheets

(56) References Cited

OTHER PUBLICATIONS

International Search Report and Written Opinion—PCT/US2019/014316—ISA/EPO—dated Mar. 19, 2019.
Rusanovskyy D., et al., "CE11: Test on Long De Blocking Filtering from JVET-J0021/K0334 (CE11.1.4)", 12. JVET Meeting, Oct. 3, 2018-Oct. 12, 2018, Macao, (The Joint Video Exploration Team of ISO/IEC JTC1/SC29/WG11 and ITU-T SG.16), No. JVET-L0403 Oct. 4, 2018 (Oct. 4, 2018), XP030194727, pp. 1-12, Retrieved from the Internet:URL:http://phenix.int-evry.fr/jvet/doc_end_user/documents/12Macao/wg11/JVET-L0403-v3.zip JVET-L0403 CF11.1.4_r2.docx[retrieved on Oct. 4, 2018] the whole document.
Shi Z., et al., "CE12, Subset 1: Report of De blocking for Large Size Blocks", 7. JCT-VC Meeting, 98. MPEG Meeting, Nov. 21, 2011-Nov. 30, 2011, Geneva, (Joint Collaborative Team on Video Coding of ISO/IEC JTC1/SC29/WG11 and ITU-T SG.16 ), URL: http://wftp3.itu.int/av-arch/jctvc-site/,No. JCTVC-G409, Nov. 8, 2011 (Nov. 8, 2011), XP030110393, pp. 1-19.

\* cited by examiner

DEBLOCKING FILTER SELECTION AND APPLICATION IN VIDEO CODING

CLAIM OF PRIORITY UNDER 35 U.S.C. § 119

The present application for patent claims priority to Provisional Application No. 62/619,777; entitled "DEBLOCKING FILTER SELECTION AND APPLICATION IN VIDEO CODING"; filed Jan. 20, 2018 and hereby expressly incorporated by reference herein.

BACKGROUND

Field

This application is directed to the field of video coding, e.g., encoding and decoding of video bitstreams. Particular aspects include a video deblocking filter, including as an in-loop coding tool in a video encoder/decoder (codec).

Background

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-View Video Coding (MVC) extensions.

In addition, a new video coding standard, namely High Efficiency Video Coding (HEVC) or ITU-T H.265, including its range extension, multi-view extension (MV-HEVC) and scalable extension (SHVC), has recently been developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG). The latest HEVC draft specification is publicly available online from MPEG and ITU-T.

ITU-T VCEG (Q6/16) and ISO/IEC MPEG (JTC 1/SC 29/WG 11) recently studies the potential need for standardization of future video coding technology with a compression capability that significantly exceeds that of the current HEVC standard (including its current extensions and near-term extensions for screen content coding and high-dynamic-range coding). The groups are working together on this exploration activity in a joint collaboration effort known as the Joint Video Exploration Team (JVET) to evaluate compression technology designs proposed by their experts in this area. The JVET first met during 19-21 Oct. 2015. And the latest version of reference software, i.e., Joint Exploration Model 7 (JEM 7) could be downloaded from jvet.hhi.fraunhofer.de. Algorithm description of Joint Exploration Test Model 7 (JEM7) could be found in the publicly available document JVET-G1001.

The AVC, HEVC and developmental JEM7 codecs include a deblocking filter tool. In such block based coding systems, differences in coding of adjacent blocks can result in "blockiness" artifacts along the boundaries of blocks. The deblocking tools in these codecs are "in-loop" filters. In an "in-loop" filter, the filtered pictures are stored back into a decoded picture buffer and used to predict other pictures in a sequence of video frames. Implementations of prior codecs that did not include deblocking filter tools often made use of post-loop filters, in which the filtered pictures were merely output for display. It has been found that using the results of deblocking filters for prediction increases coding efficiency so such tools are likely to be included in future coding systems. A need thus exists in future codecs (for example, codecs derived or similar to HEVC or JEM) for improved deblocking filters.

SUMMARY

Codecs that use larger blocks may have larger boundary regions that may benefit from filtering. In some embodiments, the deblocking filter determines filters and/or a number of samples of the block to be filtered based on block dimensions.

One embodiment includes a method of using a deblocking filter on video data. The method includes obtaining a first reconstructed video block. The method further includes determining deblocking filter parameters for the video block based on at least one dimension of the size of the video block. The filter parameters include a filter to be applied or a number of pixels along a boundary with a neighboring block to which the filter is to be applied determined based on the at least one dimension. The method further includes applying the deblocking filter to pixel samples of the video block based on the determined filter parameters.

Another embodiment includes an apparatus for using a deblocking filter on video data. The apparatus includes a memory configured to store a first reconstructed block and a neighboring block of video data. The apparatus further includes video processing circuity configured to obtain the first reconstructed video block. The video processing circuity is further configured to determine deblocking filter parameters for the video block based on at least one dimension of the size of the video block. The filter parameters include a filter to be applied or a number of pixels along a boundary with the neighboring block to which the filter is to be applied determined based on the at least one dimension. The video processing circuitry is further configured to apply the deblocking filter to pixel samples of the video block based on the determined filter parameters.

Another embodiment includes an apparatus for using a deblocking filter on video data. The apparatus includes means for storing a first reconstructed block and a neighboring block of video data. The apparatus further includes means for obtaining the first reconstructed video block. The apparatus further includes means for determining deblocking filter parameters for the video block based on at least one dimension of the size of the video block. The filter parameters include a filter to be applied or a number of pixels along a boundary with the neighboring block to which the filter is to be applied determined based on the at least one dimension. The apparatus further includes means for applying the deblocking filter to pixel samples of the video block based on the determined filter parameters.

Another embodiment includes an apparatus for using a deblocking filter on video data. The apparatus includes a non-transitory computer readable medium having stored thereon instructions that when executed cause a processor to obtain a first reconstructed video block and determine deblocking filter parameters for the video block based on at least one dimension of the size of the video block. The filter parameters include a filter to be applied or a number of pixels along a boundary with a neighboring block to which the filter is to be applied determined based on the at least one dimension. The instructions further cause the processor to apply the deblocking filter to pixel samples of the video block based on the determined filter parameters.

DETAILED DESCRIPTION

Prior deblocking processes such as in HEVC/JEM and other existing coding systems have a number of limitations. For example, in JEM, deblocking filter decisions are made for every CU boundary. The size of CUs on either side of a boundary can be larger than 16×16. If both of such CUs are smooth, then filtering 2, 3 pixels neighboring on the boundary of such large blocks may not be enough to remove the visual blocking artifact. However, of a longer filter is used for deblocking boundaries of larger CUs, then determinations about additional conditions may need to be performed to decide if/when the deblocking filter should be applied.

For example, in some cases with wider filters, pixels may be filtered twice, once while deblocking the left boundary (in the case of a vertical boundary) of the block and a second time while deblocking the right boundary of the block. Pixels filtered while deblocking the left boundary may need to be used to make filtering decisions while deblocking the right boundary. Because of this, all vertical block boundaries may not be deblocked simultaneously with parallel processing. Similarly, all horizontal block boundaries may not be deblocked simultaneously with parallel processing.

As discussed further below, in order to address these limitations, embodiments may include deblocking filters in which the deblocking filter determines filters and/or number of samples to be filtered based on block sizes. Various examples are described in more detail herein. In addition, or alternatively, for filtering vertical boundaries, in some embodiments, the deblocking filter may always utilize the reconstructed samples to decide the filter and how many samples to be filtered.

Figure 1:
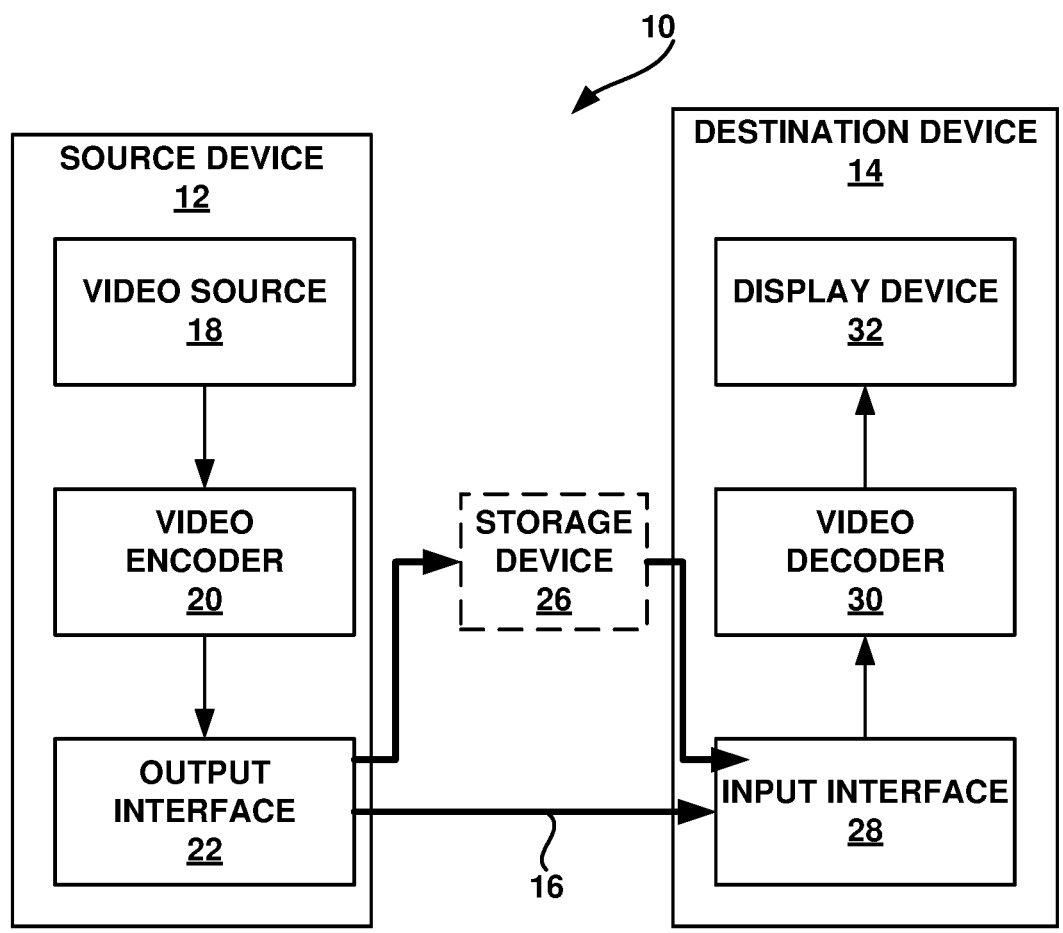
FIG. 1 is a block diagram illustrating an example video encoding and decoding system that may utilize the techniques described in this disclosure.

As context to discuss examples and embodiments in further details, FIG. 1 is a block diagram illustrating an example video encoding and decoding system 10 that may utilize the techniques described in this disclosure. As shown in FIG. 1, system 10 includes a source device 12 that generates encoded video data to be decoded at a later time by a destination device 14. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via a link 16. Link 16 may comprise any type of medium or device capable of moving the encoded video data from source device 12 to destination device 14. In one example, link 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In another example, encoded data may be output from output interface 22 to a storage device 26. Similarly, encoded data may be accessed from storage device 26 by input interface. Storage device 26 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 26 may correspond to a file server or another intermediate storage device that may hold the encoded video generated by source device 12. Destination device 14 may access stored video data from storage device 26 via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 26 may be a streaming transmission, a download transmission, or a combination of both.

The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes a video source 18, video encoder 20 and an output interface 22. In some cases, output interface 22 may include a modulator/demodulator (modem) and/or a transmitter. In source device 12, video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called smartphones, camera phones or video phones. However, the techniques described in this disclosure may be applicable to video coding in general, and may be applied to wireless and/or wired applications.

The captured, pre-captured, or computer-generated video may be encoded by video encoder 20. The encoded video data may be transmitted directly to destination device 14 via output interface 22 of source device 12. The encoded video data may also (or alternatively) be stored onto storage device 26 for later access by destination device 14 or other devices, for decoding and/or playback.

Destination device 14 includes an input interface 28, a video decoder 30, and a display device 32. In some cases, input interface 28 may include a receiver and/or a modem. Input interface 28 of destination device 14 receives the encoded video data over link 16. The encoded video data communicated over link 16, or provided on storage device 26, may include a variety of syntax elements generated by video encoder 20 for use by a video decoder, such as video decoder 30, in decoding the video data. Such syntax elements may be included with the encoded video data transmitted on a communication medium, stored on a storage medium, or stored a file server.

Display device 32 may be integrated with, or external to, destination device 14. In some examples, destination device 14 may include an integrated display device and also be configured to interface with an external display device. In other examples, destination device 14 may be a display device. In general, display device 32 displays the decoded video data to a user, and may comprise any of a variety of display devices such as a liquid crystal display (LCD), a plasma display, an organic light emitting diode (OLED) display, or another type of display device.

Video encoder 20 and video decoder 30 may operate according to newer v video compression standards that operate similarly to the recently finalized High Efficiency Video Coding (HEVC) standard. In particular, techniques of this disclosure may utilize HEVC terminology for ease of explanation. It should not be assumed, however, that the techniques of this disclosure are limited to HEVC, and in fact, it is explicitly contemplated that the techniques of this disclosure may be implemented in successor standards to HEVC and its extensions.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device. Such circuitry can be specified using a commercially available hardware description language and implemented using commercially available systems.

In HEVC and other video coding specifications, a video sequence typically includes a series of pictures. Pictures may also be referred to as "frames." In one example approach, a picture may include three sample arrays, denoted $S_L$, $S_{Cb}$, and $S_{Cr}$. In such an example approach, $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

Figure 2:
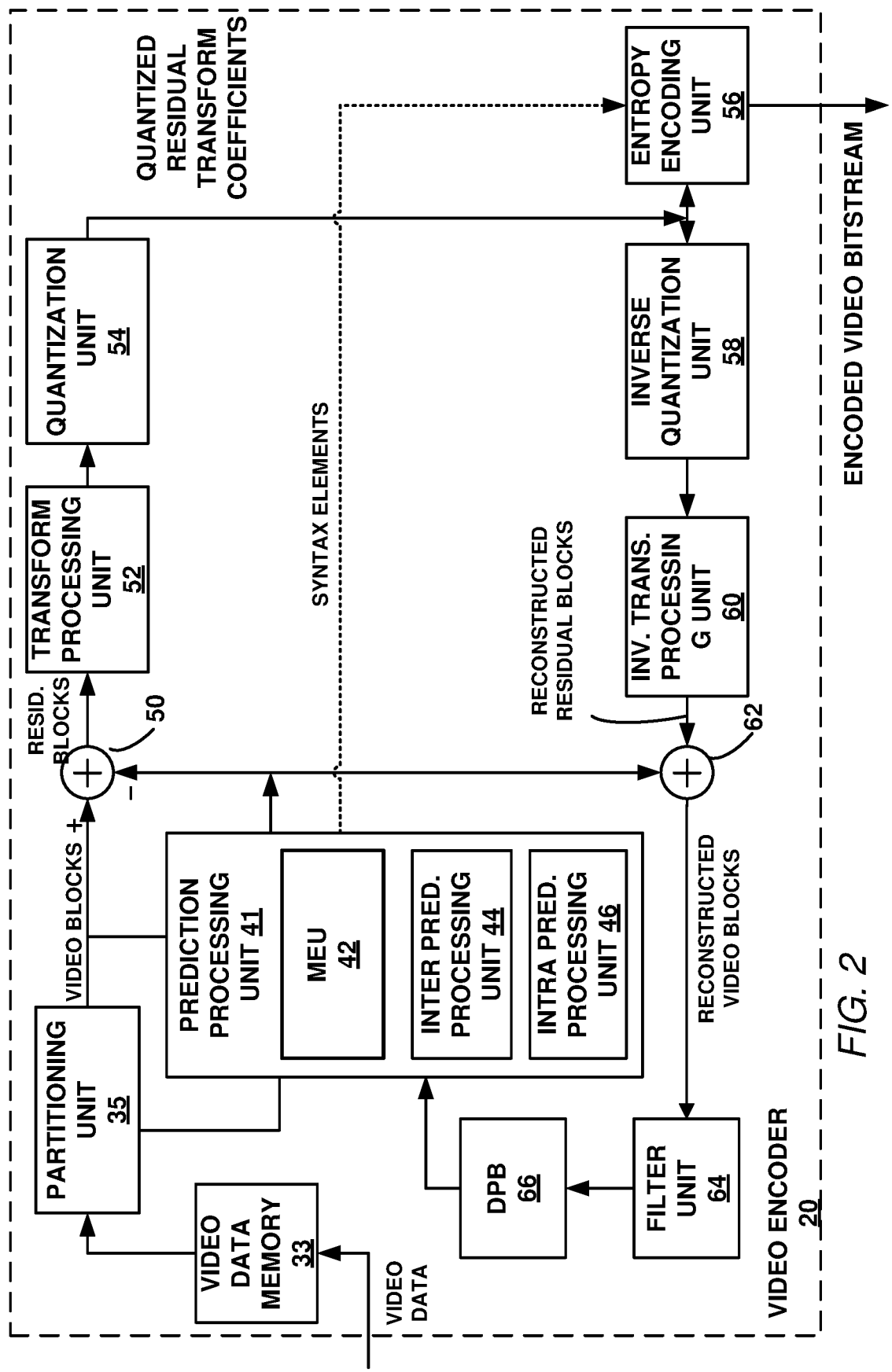
FIG. 2 is a block diagram illustrating an example video encoder that may implement the techniques described in this disclosure.

FIG. 2 is a block diagram illustrating an example video encoder 20 that may implement the techniques described in this disclosure. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

In the example of FIG. 2, video encoder 20 includes a video data memory 33, partitioning unit 35, prediction processing unit 41, summer 50, transform processing unit 52, quantization unit 54, entropy encoding unit 56. Prediction processing unit 41 includes motion estimation unit (MEU) 42, motion compensation unit (MCU) 44, and intra prediction unit 46. For video block reconstruction, video encoder 20 also includes inverse quantization unit 58, inverse transform processing unit 60, summer 62, filter unit 64, and decoded picture buffer (DPB) 66.

As shown in FIG. 2, video encoder 20 receives video data and stores the received video data in video data memory 33. Video data memory 33 may store video data to be encoded by the components of video encoder 20. The video data stored in video data memory 33 may be obtained, for example, from video source 18. DPB 66 may be a reference picture memory that stores reference video data for use in encoding video data by video encoder 20, e.g., in intra- or inter-coding modes. Video data memory 33 and DPB 66 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 33 and DPB 66 may be provided by the same memory device or separate memory devices. In various examples, video data memory 33 may be on-chip with other components of video encoder 20, or off-chip relative to those components.

Partitioning unit 35 retrieves the video data from video data memory 33 and partitions the video data into video blocks. This partitioning may also include partitioning into slices, tiles, or other larger units, as wells as video block partitioning, e.g., according to a quadtree structure of LCUs and CUs. Video encoder 20 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra coding modes or one of a plurality of inter coding modes, for the current video block based on error results (e.g., coding rate and the level of distortion). Prediction processing unit 41 may provide the resulting intra- or inter-coded block to summer 50 to generate residual block data and to summer 62 to reconstruct the encoded block for use as a reference picture.

Intra prediction unit 46 within prediction processing unit 41 may perform intra-predictive coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices or B slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in DPB 66. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in DPB 66. As discussed in more detail below, the motion vector for a block may be determined by a motion vector predictor from a candidate list of neighbor blocks. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in one of the reference picture lists. Video encoder 20 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by video decoder 30 in decoding the video blocks of the video slice.

After prediction processing unit 41 generates the predictive block for the current video block, either via intra prediction or inter prediction, video encoder 20 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. In another example, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Following the entropy encoding by entropy encoding unit 56, the encoded bitstream may be transmitted to video decoder 30, or archived for later transmission or retrieval by video decoder 30. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within one of the reference picture lists. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed block.

Filter unit 64 filters the reconstructed block (e.g. the output of summer 62) and stores the filtered reconstructed block in DPB 66 for uses as a reference block. The reference block may be used by motion estimation unit 42 and motion compensation unit 44 as a reference block to inter-predict a block in a subsequent video frame or picture. Although not explicitly shown in FIG. 2, video encoder 20 may include additional filters such as a deblock filter, a sample adaptive offset (SAO) filter, or other types of loop filters. A deblock filter may, for example, apply deblocking filtering to filter block boundaries to remove blockiness artifacts from reconstructed video. An SAO filter may apply offsets to reconstructed pixel values in order to improve overall coding quality. Additional loop filters (in loop or post loop) may also be used.

Figure 3:
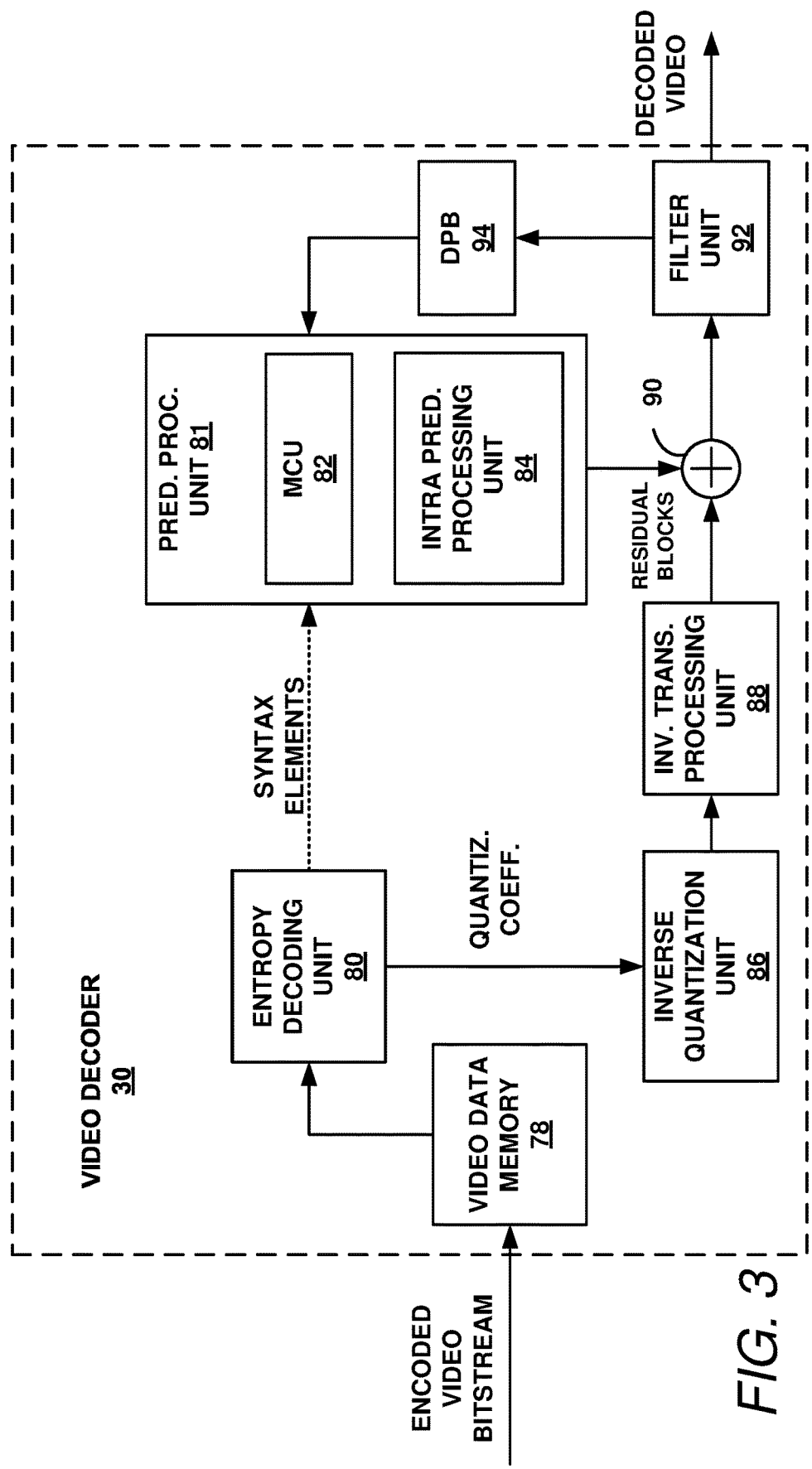
FIG. 3 is a block diagram illustrating an example video decoder that may implement the techniques described in this disclosure.

FIG. 3 is a block diagram illustrating an example video decoder 30 that may implement the techniques described in this disclosure. Video decoder 30 of FIG. 3 may, for example, be configured to receive the signaling described above with respect to video encoder 20 of FIG. 2. In the example of FIG. 3, video decoder 30 includes video data memory 78, entropy decoding unit 80, prediction processing unit 81, inverse quantization unit 86, inverse transform processing unit 88, summer 90, filter unit 92, and DPB 94. Prediction processing unit 81 includes motion compensation unit 82 and intra prediction processing unit 84. Video decoder 30 may, in some examples, perform a decoding pass generally reciprocal to the encoding pass described with respect to video encoder 20 from FIG. 2.

During the decoding process, video decoder 30 receives an encoded video bitstream that represents video blocks of an encoded video slice and associated syntax elements from video encoder 20. Video decoder 22 stores the received encoded video bitstream in video data memory 78. Video data memory 78 may store video data, such as an encoded video bitstream, to be decoded by the components of video decoder 30. The video data stored in video data memory 78 may be obtained, for example, via link 16, from storage device 26, or from a local video source, such as a camera, or by accessing physical data storage media. Video data memory 78 may form a coded picture buffer (CPB) that stores encoded video data from an encoded video bitstream. DPB 94 may be a reference picture memory that stores reference video data for use in decoding video data by video decoder 30, e.g., in intra- or inter-coding modes. Video data memory 78 and DPB 94 may be formed by any of a variety of memory devices, such as DRAM, SDRAM, MRAM, RRAM, or other types of memory devices. Video data memory 78 and DPB 94 may be provided by the same memory device or separate memory devices. In various examples, video data memory 78 may be on-chip with other components of video decoder 30, or off-chip relative to those components.

Entropy decoding unit 80 of video decoder 30 entropy decodes the video data stored in video data memory 78 to generate quantized coefficients, motion vectors, and other syntax elements. Entropy decoding unit 80 forwards the motion vectors and other syntax elements to prediction processing unit 81. Video decoder 30 may receive the syntax elements at the video slice level and/or the video block level.

When the video slice is coded as an intra-coded (I) slice, intra prediction processing unit 84 of prediction processing unit 81 may generate prediction data for a video block of the current video slice based on a signaled intra prediction mode and data from previously decoded blocks of the current frame or picture. When the video frame is coded as an inter-coded slice (e.g., B slice or P slice), motion compensation unit 82 of prediction processing unit 81 produces predictive blocks for a video block of the current video slice based on the motion vectors and other syntax elements received from entropy decoding unit 80. The predictive blocks may be produced from one of the reference pictures within one of the reference picture lists. Video decoder 30 may construct the reference frame lists, List 0 and List 1, using default construction techniques based on reference pictures stored in DPB 94.

Motion compensation unit 82 determines prediction information for a video block of the current video slice by parsing the motion vectors and other syntax elements, and uses the prediction information to produce the predictive blocks for the current video block being decoded. For example, motion compensation unit 82 uses some of the received syntax elements to determine a prediction mode (e.g., intra- or inter-prediction) used to code the video blocks of the video slice, an inter-prediction slice type (e.g., B slice or P slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by video encoder 20 during encoding of the video blocks to calculate interpolated values for sub-integer pixels of reference blocks. In this case, motion compensation unit 82 may determine the interpolation filters used by video encoder 20 from the received syntax elements and use the interpolation filters to produce predictive blocks.

Inverse quantization unit 86 inverse quantizes, i.e., de-quantizes, the quantized transform coefficients provided in the bitstream and decoded by entropy decoding unit 80. The inverse quantization process may include use of a quantization parameter calculated by video encoder 20 for each video block in the video slice to determine a degree of quantization and, likewise, a degree of inverse quantization that should be applied. Inverse transform processing unit 88 applies an inverse transform, e.g., an inverse DCT, an inverse integer transform, or a conceptually similar inverse transform process, to the transform coefficients in order to produce residual blocks in the pixel domain.

After prediction processing unit 81 generates the predictive block for the current video block using, for example, intra or inter prediction, video decoder 30 forms a reconstructed video block by summing the residual blocks from inverse transform processing unit 88 with the corresponding predictive blocks generated by motion compensation unit 82. Summer 90 represents the component or components that perform this summation operation. Filter unit 92 filters the reconstructed video block using, for example, one or more of the ALF techniques, SAO techniques, deblocking techniques or other such filtering techniques.

Although not explicitly shown in FIG. 2, video decoder 30 may also include one or more of a deblocking filter, an SAO filter, or other types of filters. Other loop filters (either in the coding loop or after the coding loop) may also be used to smooth pixel transitions or otherwise improve the video quality. The decoded video blocks in a given frame or picture are then stored in DPB 94, which stores reference pictures used for subsequent motion compensation. DPB 94 may be part of or separate from additional memory that stores decoded video for later presentation on a display device, such as display device 32 of FIG. 1.

In particular, with reference to operation of inter prediction processing units 44 and motion compensation unit 82, to code a block (e.g., of a prediction unit (PU) of video data), a predictor for the block is first derived. The predictor can be derived either through intra (I) prediction (i.e. spatial prediction) or inter (P or B) prediction (i.e. temporal prediction). Hence, some prediction units may be intra-coded (I) using spatial prediction with respect to neighbouring reference blocks in the same picture, and other prediction units may be inter-coded (P or B) with respect to reference blocks in other pictures. In some cases, a reference block may be in the same picture. It is noted that the terms "picture" and "frame" are generally used interchangeably in the current application.

Upon identification of a predictor, the difference between the original video data block and its predictor is calculated. This difference is also called the prediction residual, and refers to the pixel value differences between the pixels of the block to be coded and corresponding pixels of the reference block, i.e., predictor. To achieve better compression, the prediction residual (i.e., the array of pixel difference values) is generally transformed, e.g., using a discrete cosine transform (DCT), integer transform, Karhunen-Loeve (K-L) transform, or other transform.

Coding a block using inter-prediction involves calculating a motion vector between a current block and a block in a reference picture. Motion information thus includes both a motion vector and an indication of the reference picture. Motion vectors are calculated through a process called motion estimation (or motion search). A motion vector, for example, may indicate the displacement of a prediction unit in a current picture relative to a reference sample of a reference picture. A reference sample may be a block that is found to closely match the portion of the CU including the PU being coded in terms of pixel difference, which may be determined by sum of absolute difference (SAD), sum of squared difference (SSD), or other difference metrics. The reference sample may occur anywhere within a reference picture or reference slice. In some examples, the reference sample may occur at a fractional pixel position. Upon finding a portion of the reference picture that best matches the current portion, the encoder determines the current motion vector for the current portion as the difference in the location from the current portion to the matching portion in the reference picture (i.e., from the center of the current portion to the center of the matching portion).

In some examples, an encoder may signal the motion vector for each portion in the encoded video bitstream. The signaled motion vector is used by the decoder to perform motion compensation in order to decode the video data. However, signaling the original motion vector directly may result in less efficient coding, as a large number of bits are typically needed to convey the information.

Rather than directly signaling the original motion vector, the encoder may predict a motion vector for each partition, i.e., for each PU. In performing this motion vector prediction, the encoder may select a set of candidate motion vectors determined from spatially neighboring blocks in the same picture as the current portion or a candidate motion vector determined from a co-located block in a reference picture. The encoder may perform motion vector prediction, and if needed, signal the prediction difference rather than signal an original motion vector to reduce bit rate in signaling. The candidate motion vectors from the spatially neighboring blocks may be referred to as spatial MVP candidates, whereas the candidate motion vector from the co-located block in another reference picture may be referred to as temporal MVP candidate.

For each block, various types of motion information may be available. The motion information includes motion information for forward and backward prediction directions. In some embodiments, forward and backward prediction directions are two prediction directions corresponding to different reference picture lists, e.g., reference picture list 0 (RefPicList0) and reference picture list 1 (RefPicList1) of a current picture or slice. The terms "forward" and "backward" do not necessarily have a geometry meaning. Instead, they are used to distinguish which reference picture list a motion vector is based on. Forward prediction means the prediction formed based on reference list 0, while backward prediction means the prediction formed based on reference list 1. In case both reference list 0 and reference list 1 are used to form a prediction for a given block, it is called bi-directional prediction.

For a given picture or slice, if only one reference picture list is used, every block inside the picture or slice is forward predicted. If both reference picture lists are used for a given picture or slice, a block inside the picture or slice may be forward predicted, or backward predicted, or bi-directionally predicted.

For each prediction direction, the motion information contains a reference index and a motion vector. A reference index is used to identify a reference picture in the corresponding reference picture list (e.g. RefPicList0 or RefPicList1). A motion vector has both a horizontal and a vertical component, with each indicating an offset value along horizontal and vertical direction respectively. In some descriptions, for simplicity, the word of "motion vector" may be used interchangeably with motion information, to indicate both the motion vector and its associated reference index.

Figure 4:
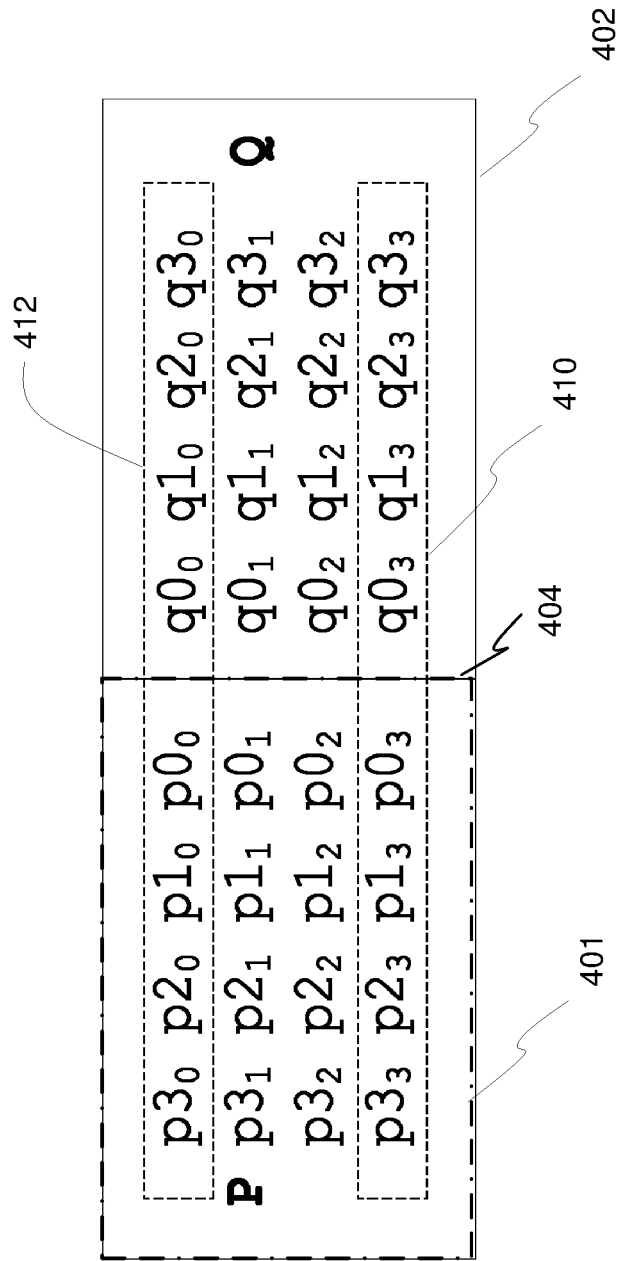
FIG. 4 is a diagram illustrating a vertical block boundary and pixels of the corresponding blocks to be filtered.

FIG. 4 is a diagram illustrating a vertical block boundary and pixels of the corresponding blocks to be filtered using filter units 64 and/or 92 of the video encoder 20 and video decoder 30 respectively. Generally, in an in-loop filter both the units 64 and 92 perform similar filtering with the filter unit 64 of the encoder 20 signaling filter parameters to the filtering unit 92 of the decoder 30 in the encoded video bitstream.

In FIG. 4, a block 401 neighbors a block 402 via a vertical boundary 404. Pixels of the block 401 are labeled with "p" and those of the block 402 are labeled with "q." Various embodiments are described relative to such terminology. It is noted that similar processes are applied for horizontal boundaries between horizontally neighboring blocks (not shown) except where otherwise noted.

The filter units 64 and 92 each implement corresponding portions of a deblocking filter coding tool. Input to the deblocking filter coding tool is the reconstructed image after intra or inter prediction. Embodiments herein are described as improvement to the deblocking filter coding tool of HEVC. It is to be recognized that similar inventive aspects can be applied to any suitable block based coding system.

The deblocking filter performs detection of the artifacts at the coded block boundaries and attenuates them by applying a selected filter. Compared to the H.264/AVC deblocking filter, the HEVC deblocking filter has lower computational complexity and better parallel processing capabilities while still achieving significant reduction of the visual artifacts. In HEVC, the deblocking filter decisions are made separately for each boundary of four-sample length that lies on the grid dividing the picture into blocks of 8×8 samples. In this example, deblocking is performed on a block boundary if the following conditions are true: (1) the block boundary 4-4 is a prediction unit (PU) or transform unit (TU) boundary; (2) the boundary strength (Bs), as defined in Table 1, is greater than zero; (3) variation of signal, as defined in Equation (1), on both sides of a block boundary 404 is below a specified threshold.

TABLE 1

Bs values for boundaries between two neighboring luma blocks

| Conditions | Bs |
|---|---|
| At least one of the blocks is Intra | 2 |
| At least one of the blocks has non-zero coded residual coefficient and boundary is a transform boundary | 1 |
| Absolute differences between corresponding spatial motion vector components of the two blocks are >=1 in units of integer pixels | 1 |
| Motion-compensated prediction for the two blocks refers to different reference pictures or the number of motion vectors is different for the two blocks | 1 |
| Otherwise | 0 |

FIG. 4 illustrates a four-pixel long vertical block boundary. Deblocking decisions in HEVC are based pixels such as in regions 410 and 412. For example, if Bs>0 for a luma block boundary then the deblocking filtering is applied to that boundary the following condition holds:

$$|p_{2,0}-2p_{1,0}+p_{0,0}|+|p_{2,3}-2p_{1,3}+p_{0,3}|+|q_{2,0}-2q_{1,0}+q_{0,0}|+|q_{2,3}-2q_{1,3}+q_{0,3}|<\beta \quad (1)$$

In Equation (1), the terms $p_{i,j}$ and $q_{i,j}$ denote the pixels in column i and row j on either side of the block boundary 404. Threshold $\beta$ depends on the quantization parameter used for quantizing prediction error transform coefficients. Note that the above condition is for a vertical block boundary. Conditions for filtering a horizontal block boundary can be written similarly.

HEVC allows for two types luma deblocking filters: (1) normal filter (2) strong filter. The choice of deblocking filter depends on whether particular signal variation terms (which are a function of the pixels shown in FIG. 2) are less than certain thresholds. Although the filtering decisions are based only on the two rows (columns) of a four pixel long vertical (horizontal) boundary, the filter is applied to every row (column) in the boundary. The number of pixels used in the filtering process and the number of pixels that may be modified with each type of filtering is summarized in Table 2.

TABLE 2

Number of pixels used/modified per boundary in HEVC deblocking

| | Pixels used (on either side of boundary) | Pixels modified (on either side of boundary) |
|---|---|---|
| Normal filter | 3 or 2 | 2 or 1 |
| Strong filter | 4 | 3 |

In the example of HEVC, chroma deblocking is performed only when Bs equals 2. Only one type of chroma deblocking filter is used. It uses pixels $p_0$, $p_1$, $q_0$, $q_1$ and may modify pixels $p_0$ and $q_0$ in each row (the second subscript indicating the row index is omitted for brevity since the filter is applied to every row).

In JEM, deblocking is performed at CU level. The size of CUs on either side of a boundary can be larger than 8×8. The minimum CU size is in JEM is 4×4. Therefore, the deblocking filter may also be applied to boundaries of 4×4 blocks.

As noted above, in order to address limitations of prior deblocking filters, embodiments may include deblocking filters in which the deblocking filter determines filters and/or number of samples to be filtered based on block sizes. Various examples are described in more detail herein to improve the coding gains and visual quality obtained by the deblocking process. In addition, or alternatively, for filtering vertical boundaries, in some embodiments, the deblocking filter may always utilize the reconstructed samples to decide the filter and how many samples to be filtered. It is further noted that the examples herein are described relative to prior deblocking filters such as in AVC or HEVC.

For example, some embodiments, the deblocking filter units 64 and 92 determines deblocking filter parameters such as the filter to be used and/or number of samples to be filtered based on block sizes.

In examples, below the deblocking is described relative to two blocks that are coding units. However, the technique can similarly be applied where deblocking is performed at different boundary levels.

For example, determining the filter may including determining whether to use shorter and longer-tap deblocking filters (DBF) to be applied based on different block sizes. In one example, for the two blocks 401 and 402 sharing the boundary 404, a minimum dimension is used to determine deblocking filter parameters such as the length in taps of the filter to used. For example, if the minimum width (vertical boundary such as in FIG. 4) and minimum height (for a horizontal boundary (not shown) of the two blocks are both equal to or larger than K (e.g., K=16), the longer-tap DBF may be applied.

In one example, when filtering the vertical boundary, for the two blocks 401,402 sharing the boundary 404, if the minimum width (or height for filtering horizontal boundary) of one block is equal to or larger than K (e.g., K=16) and the minimum width (or height for filtering horizontal boundary) of the other block is smaller than L (e.g., L=K), the longer-tap DBF may be applied to the block and shorter-tap DBF may applied to the other block.

In some embodiments, the deblocking parameters may include a variable number of pixel samples to be filtered. For example, more than a specified threshold, e.g., X (e.g., X=3) samples may be filtered for a block boundary based on determining deblocking filter parameters based on the block sizes.

In one example, for the two blocks 401, 402 sharing the boundary 404, if the minimum width and height of the two blocks are both equal to or larger than a threshold K (e.g., K=16), M (e.g., M=4) samples per block may be filtered. In another example, when filtering the vertical boundary, for the two blocks sharing the boundary, if the minimum width (or height for filtering horizontal boundary) of one block is equal to or larger than K (e.g., K=16) and the minimum width (or height for filtering horizontal boundary) of the other block is smaller than another threshold, L (e.g., L=K), M (e.g., M=4) samples within the block may be filtered, and N (e.g., N=1, or 2, or 3) samples within the other block may be filtered.

In some embodiments, determining filter parameters such as the filter taps and/or number of samples to be filtered may further depend on the characteristics of the block. In some embodiments, this characteristic may include smoothness of the block.

For example, the deblocking filter parameters may be determined based on a calculation of a function indicative of smoothness of the block.

In one example, the characteristics are defined as the second derivatives of selected samples within the two blocks covering the boundary to be filtered. For example, the second derivative for a sample x(n) may be defined as:

$$x(n+m)-2x(n)+x(n-m)$$

wherein x(n+m) and x(n−m) (e.g., m=1) are the two neighboring samples along the horizontal or vertical or other directions.

In another example, the characteristics are defined as the first derivative of selected samples within the two blocks covering the boundary to be filtered, For example, the horizontal first derivative for sample x(n) may be defined as:

$$x(n)-x(n+m)$$

wherein x(n+m) (e.g., m=1) is the neighboring sample along the horizontal or vertical or other directions.

In some embodiments, all samples within the two blocks are taken into consideration to evaluate the smoothness. Alternatively, less than all samples in the blocks are used in the calculation of the smoothness function. In one example, samples used may be determined by horizontal or vertical sub-sampling.

Figure 5:
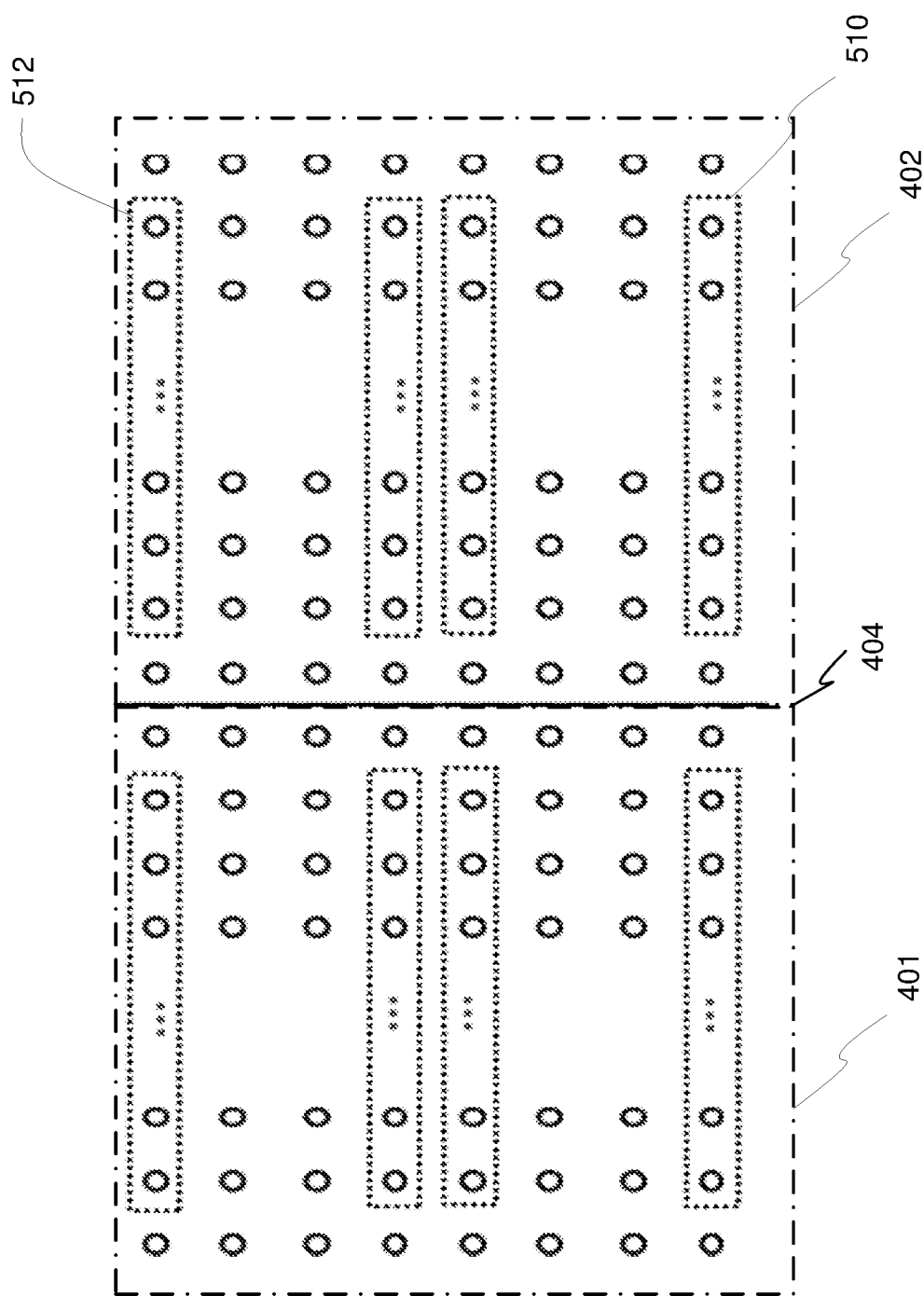
FIG. 5 is another diagram illustrating a vertical block boundary and pixels of the corresponding blocks to be filtered.

FIG. 5 is another diagram illustrating a vertical block boundary 404 and pixels of the corresponding blocks 401 and 402 to be filtered. In particular, groups or sets of pixels 510 and 512 are identified. In one embodiment, the filter units 64 and 92 may determine the filtering parameters such that the longer-tap DBF may be applied to vertical boundaries only if sum of the absolute values of the smoothness function in the horizontal direction at certain pixels such pixel groups 510 and 512 or one or both blocks is less than a certain threshold.

In one example, similar condition may be used to make decision for filtering horizontal block boundaries by considering second derivatives in vertical direction. Alternatively, whenever filtering one boundary, second derivatives in the horizontal directions and vertical directions are both taken into consideration. In some embodiments, different thresholds may be used depending on whether the video blocks are in a I-slice or a B-slice. Thresholds may be encoded as part of the video stream by the encoder 20 for decoding by the decoder 30. An index or flag may be signaled to select one of many predefined choices of thresholds.

In some embodiments, one of the deblocking filters may comprises 9-tap filters. Examples of longer-tap (9-tap) suitable deblocking filters are given as follows:

$h_0$=[0, 2, 9, 12, 1, 3, 13, 16, 5, 3, 0]
$h_1$=[−1, 6, 7, 8, −2, 13, 15, 10, 8, 0, 0]
$h_2$=[−1, 4, 12, −3, 6, 14, 14, 16, 2, 0, 0]
$h_3$=[−3, 16, −3, 1, 5, 16, 18, 14, 0, 0, 0]

In one such example, The filtering operation that modifies pixel x(n) in a given row using a filter $h_i$ is defined as:

$$x'(n) = \frac{1}{64}\left(\sum_{k=0}^{10} h_i(k)x(n+k-5) + 32\right),$$

where x(n+k) denotes the pixel in the same row as x(n) with column index (n+k). x'(n) may be clipped to lie in a range [x(n+k)−δ, x(n+k)+δ], where δ is optionally a function of the quantization parameter.

In one example, $h_i$ may be used to filter samples $p_{ji}$, and $q_{ji}$, as depicted in FIG. 4 wherein j denotes the row or column index. It is to be recognized that this filter can be applied at horizontal coding unit boundaries by considering the image rotated by 90° in the clockwise direction.

In some embodiments, determining the deblocking parameters includes determining the number of samples to filtered based on a portion of the dimension of the coding unit. For example, determined based on the width of the block for a vertical block boundary or the height for a horizontal block boundary. For example, in some embodiments, if width of a CU on either side of a vertical block boundary is N, the the deblocking parameters are determined such that a maximum of N/2 samples may be filtered. In one example, if N is equal to 4, the 3rd pixel from the boundary 404 in FIG. 4. is disallowed to be modified during horizontal filtering. Desirably, this will allow for simultaneous filtering of all vertical block boundaries by parallel processing.

In one example, similarly, if a width of the coding units 401 or 402 on either side of a vertical block boundary 404 is N, the deblocking parameters may be determined so that a maximum of N/2 samples may be filtered. In another example, if height of a CU on either side of a horizontal block boundary is 4, the 3rd pixel from the boundary is disallowed to be modified during vertical filtering.

In some embodiments, the deblock filter 64,92 may disable the filtering of samples within a block along the vertical boundary if the width of the block is equal or smaller than a threshold K. In other words, the deblocking parameters may be determined such that no filter is applied to the pixels of the blocks 401 or 402.

In one example, the deblock filter 64,92 disables the filtering of samples within a block along the horizontal boundary if the height of the block is equal or smaller than K. In one example, if either the width of the two blocks is equal or smaller to K, deblock filtering may be disabled for samples in both blocks along a vertical boundary. In one example, if either the height of the two blocks is equal or smaller to K, deblock filtering may be disabled for samples in both blocks along a horizontal boundary. In one non-limiting example, K is set to 4, but any size less than the maximum block dimensions may be used.

As noted above, filtering of different boundaries may result in particular samples being deblock filtered more than one time through vertical then horizontal boundary filtering. For filtering vertical boundaries, in some embodiments, the deblocking filter 64,92 may always utilize the (original) reconstructed samples to decide the filter and how many samples to be filtered and then filtered samples may be utilized to filter neighboring samples. In one example, furthermore, samples subsequent to the vertical boundary filtering process are stored and used for filter decision and number of samples to be filtered decision. While the filtered samples subsequent to horizontal filtering process may be utilized to filter neighboring samples.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The techniques described herein may be implemented in hardware, software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

The coding techniques discussed herein may be embodiment in an example video encoding and decoding system. A system includes a source device that provides encoded video data to be decoded at a later time by a destination device. In particular, the source device provides the video data to destination device via a computer-readable medium. The source device and the destination device may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, the source device and the destination device may be equipped for wireless communication.

The destination device may receive the encoded video data to be decoded via the computer-readable medium. The computer-readable medium may comprise any type of medium or device capable of moving the encoded video data from source device to destination device. In one example, computer-readable medium may comprise a communication medium to enable source device to transmit encoded video data directly to destination device in real-time. The encoded video data may be modulated according to a communication standard, such as a wireless communication protocol, and transmitted to destination device. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device to destination device.

In some examples, encoded data may be output from output interface to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device. Destination device may access stored video data from the storage device via streaming or download. The file server may be any type of server capable of storing encoded video data and transmitting that encoded video data to the destination device. Example file servers include a web server (e.g., for a website), an FTP server, network attached storage (NAS) devices, or a local disk drive. Destination device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system may be configured to support one-way or two-way video transmission to support applications such as video streaming, video playback, video broadcasting, and/or video telephony.

In one example the source device includes a video source, a video encoder, and an output interface. The destination device may include an input interface, a video decoder, and a display device. The video encoder of source device may be configured to apply the techniques disclosed herein. In other examples, a source device and a destination device may include other components or arrangements. For example, the source device may receive video data from an external video source, such as an external camera. Likewise, the destination device may interface with an external display device, rather than including an integrated display device.

The example system above merely one example. Techniques for processing video data in parallel may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device and destination device are merely examples of such coding devices in which source device generates coded video data for transmission to destination device. In some examples, the source and destination devices may operate in a substantially symmetrical manner such that each of the devices include video encoding and decoding components. Hence, example systems may support one-way or two-way video transmission between video devices, e.g., for video streaming, video playback, video broadcasting, or video telephony.

The video source may include a video capture device, such as a video camera, a video archive containing previously captured video, and/or a video feed interface to receive video from a video content provider. As a further alternative, the video source may generate computer graphics-based data as the source video, or a combination of live video, archived video, and computer-generated video. In some cases, if video source is a video camera, source device and destination device may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by the video encoder. The encoded video information may then be output by output interface onto the computer-readable medium.

As noted the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from the source device and provide the encoded video data to the destination device, e.g., via network transmission. Similarly, a computing device of a medium production facility, such as a disc stamping facility, may receive encoded video data from the source device and produce a disc containing the encoded video data. Therefore, the computer-readable medium may be understood to include one or more computer-readable media of various forms, in various examples.

The input interface of the destination device receives information from the computer-readable medium. The information of the computer-readable medium may include syntax information defined by the video encoder, which is also used by the video decoder, that includes syntax elements that describe characteristics and/or processing of blocks and other coded units, e.g., group of pictures (GOP). A display device displays the decoded video data to a user, and may comprise any of a variety of display devices such as a cathode ray tube (CRT), a liquid crystal display (LCD), a plasma display, an organic light emitting diode (OLED) display, or another type of display device. Various embodiments of the invention have been described.

The invention claimed is:

1. A method of using a deblocking filter on video data, the method comprising:
obtaining a reconstructed video block comprising pixel samples of a picture arranged in rows and columns, the reconstructed video block having a height that is the number of the rows of the reconstructed video block and a width that is the number of the columns of the reconstructed video block, the first reconstructed video block having a boundary with a neighboring video block, the neighboring video block comprising pixel samples of the picture arranged in rows and columns, the neighboring video block having a height that is the number of the rows of the neighboring video block and a width that is the number of the columns of the neighboring video block;
determining deblocking filter parameters for a boundary of the reconstructed video block with the neighboring video block in the picture based on a first dimension of the reconstructed video block and a second dimension of the neighboring video block, the first dimension being one of the width or the height of the first reconstructed video block and the second dimension being one of the width or the height of the neighboring video block,
the first dimension being the width of the reconstructed video block when the boundary is vertical or the height of the reconstructed video block when the boundary is horizontal, and
the second dimension being the width of the neighboring video block when the boundary is vertical or the height of the neighboring video block when the boundary is horizontal,
the filter parameters comprising a filter to be applied or a number of pixels along the boundary with the neighboring video block to which the filter is to be applied,
wherein determining the deblocking filter parameters for the boundary of the reconstructed video block comprises determining whether the first dimension is less than or equal to a first threshold and determining whether the second dimension is less than or equal to the first threshold; and
applying the deblocking filter to the pixel samples of the reconstructed video block based on the determined filter parameters.

2. The method of claim 1, wherein the filter parameters comprise the number of pixels on either side of the boundary to be filtered, which is determined based on one or both of the first dimension and the second dimension.

3. The method of claim 1, wherein the filter parameters comprise the number of pixels on either side of the boundary to be filtered, which is determined to be less than half of the minimum of a specified dimension of the reconstructed video block and of the neighboring video block.

4. The method of claim 1, wherein the reconstructed video block and the neighboring video block are coding units.

5. The method of claim 1, wherein determining the deblocking filter parameters comprises determining whether to disable the deblocking filter, and wherein applying the deblocking filter to filter samples of the video block based on the determined filter parameters comprises filtering none of the pixel samples of the reconstructed video block based on a determination to disable the deblocking filter for the reconstructed video block.

6. The method of claim 1, wherein the deblocking filter parameters comprising one or more of the number of pixels along the boundary to which the filter is to be applied, a length of the filter, or a function defining the filter.

7. The method of claim 1, wherein determining the filter comprises determining whether to use one of a plurality of filters, the filters comprising a first, N, tap filter, or a second M, tap filter, with M and N being different numbers.

8. The method of claim 1, further comprising:
calculating a smoothness characteristic of pixel samples of the video block, wherein determining the deblocking filter parameters based on the calculated smoothness characteristic.

9. The method of claim 8, wherein determining the deblocking filter parameters is based on the calculated smoothness characteristic only if the reconstructed video blocks has a specified first dimension.

10. The method of claim 8, wherein calculating the smoothness characteristic of the pixel samples comprises calculating a function of all pixels of the video block.

11. The method of claim 8, wherein calculating the smoothness characteristic of the pixel samples comprises calculating a derivative of a plurality of the pixel samples of the video block.

12. The method of claim 1, further comprising calculating a smoothness characteristic of pixel of the neighboring video block.

13. The method of claim 12, wherein calculating the smoothness characteristic of the pixel samples further comprises calculating a derivative of a plurality of the pixel samples of the neighboring video block.

14. The method of claim 8, wherein determining the deblocking filter parameters based on the calculated characteristic comprises comparing the calculated characteristic to a threshold.

15. The method of claim 14, wherein the threshold is coded in a video bitstream for the video block.

16. The method of claim 1, further comprising storing a picture including the video block into a decoded picture buffer.

17. The method of claim 1, wherein obtaining the reconstructed video block comprises:
predicting the video block; and
combining the predicted video block with a residual block to obtain the reconstructed video block.

18. The method of claim 17, wherein obtaining the reconstructed video block comprises:
decoding data from a video bitstream for predicting the block;
decoding at least one transform coefficient from the video bitstream; and
generating the residual block from the at least one transform coefficient.

19. The method of claim 17, wherein obtaining the reconstructed video block comprises:
determining and encoding data into a video bitstream for predicting the block; and
encoding at least one transform coefficient indicative of the residual block into the video bitstream.

20. An apparatus for using a deblocking filter on video data, the apparatus comprising:
a memory configured to store a reconstructed video block comprising pixel samples of a picture, arranged in rows and columns, the reconstructed video block having a height that is the number of the rows of the reconstructed video block and a width that is the number of the columns of the reconstructed video block, the first reconstructed video block having a boundary with a neighboring video block, the neighboring video block comprising pixel samples of the picture arranged in rows and columns, the neighboring video block having a height that is the number of the rows of the neighboring video block and a width that is the number of the columns of the neighboring video block; and
a processor configured to:
obtain the reconstructed video block;
determine deblocking filter parameters for the boundary of the reconstructed video block with the neighboring video block in the picture based on a first dimension of the video block and a second dimension of the neighboring video block, the first dimension being one of the width or the height of the first reconstructed video block and the second dimension being one of the width or the height of the neighboring video block
the first dimension being the width of the reconstructed video block when the boundary is vertical or the height of the reconstructed video block when the boundary is horizontal, and
the second dimension being the width of the neighboring video block when the boundary is vertical or the height of the neighboring video block when the boundary is horizontal,
the filter parameters comprising a filter to be applied or a number of pixels along the boundary with the neighboring video block to which the filter is to be applied determined based on the at least one dimension,
wherein to determine the deblocking filter parameters for the boundary of the reconstructed video block based on the dimension, the processor is further configured to determine whether the first dimension is less than or equal to a first threshold and to determine whether the second dimension is less than or equal to the first threshold; and
apply the deblocking filter to the pixel samples of the reconstructed video block based on the determined filter parameters.

21. The apparatus of claim 20, wherein the filter parameters comprise the number of pixels on either side of the boundary to be filtered, which is determined based on one or both of the first dimension and the second dimension.

22. The apparatus of claim 20, wherein the filter parameters comprise the number of pixels on either side of the boundary to be filtered, which is determined to be less than half of the minimum of a specified dimension of the reconstructed video block and of the neighboring video block.

23. The apparatus of claim 20, wherein the processor is configured to obtain the reconstructed video block by:
predicting the reconstructed video block; and
combining the predicted video block with a residual block to obtain the reconstructed video block.

24. The apparatus of claim 23, wherein the processor is further configured to:
decode data from a video bitstream for predicting the reconstructed video block;
decode at least one transform coefficient from the video bitstream; and
generate the residual block from the at least one transform coefficient.

25. The apparatus of claim 24, further comprising a display configured to display the picture including the reconstructed video block.

26. The apparatus of claim 20, wherein the processor is further configured to:
determine and encode data into a video bitstream for predicting the reconstructed video block; and
encode at least one transform coefficient indicative of the residual block into the video bitstream.

27. The apparatus of claim 26, further comprising a camera configured to capture the picture including the reconstructed video block.

28. The apparatus of claim 20, wherein the processor is further configured to calculate a smoothness characteristic of pixel samples of the reconstructed video block and further configured to determine the deblocking filter parameters based on the calculated smoothness characteristic.

* * * * *